(12) United States Patent
Zhang et al.

(10) Patent No.: US 9,888,463 B2
(45) Date of Patent: Feb. 6, 2018

(54) INTERFERENCE CANCELLATION AND SUPPRESSION FOR MULTI-USER MULTIPLE-IN/MULTIPLE OUT (MIMO) COMMUNICATION

(71) Applicants: Alcatel-Lucent USA Inc., Murray Hill, NJ (US); Alcatel Lucent, Boulogne-Billancourt (FR)

(72) Inventors: Min Zhang, Swindon (GB); Shin Horng Wong, Chippenham (GB); Teck Hu, Melbourne, FL (US)

(73) Assignee: Alcatel Lucent, Boulogne-Billancourt (FR)

(*) Notice: Subject to any disclaimer, the term of this patent is extended or adjusted under 35 U.S.C. 154(b) by 35 days.

(21) Appl. No.: 14/529,765

(22) Filed: Oct. 31, 2014

(65) Prior Publication Data
US 2016/0128025 A1    May 5, 2016

(51) Int. Cl.
| | |
|---|---|
| H04L 1/00 | (2006.01) |
| H04W 72/04 | (2009.01) |
| H04B 7/0452 | (2017.01) |
| H04W 72/08 | (2009.01) |
| H04W 76/04 | (2009.01) |
| H04J 11/00 | (2006.01) |

(52) U.S. Cl.
CPC ........ H04W 72/042 (2013.01); H04B 7/0452 (2013.01); H04J 11/005 (2013.01); H04L 1/0003 (2013.01); H04W 72/082 (2013.01); H04W 76/046 (2013.01)

(58) Field of Classification Search
CPC .... H04B 7/0452; H04J 11/005; H04L 1/0003; H04W 72/042; H04W 72/082; H04W 76/046

USPC .......................................................... 370/329
See application file for complete search history.

(56) References Cited

U.S. PATENT DOCUMENTS

| | | | | |
|---|---|---|---|---|
| 9,270,425 | B2* | 2/2016 | Xue | H04W 48/16 |
| 2008/0212700 | A1* | 9/2008 | Han | H04L 1/0625 |
| | | | | 375/260 |
| 2011/0032839 | A1* | 2/2011 | Chen | H04B 7/024 |
| | | | | 370/252 |
| 2011/0273996 | A1* | 11/2011 | Kim | H04J 11/0069 |
| | | | | 370/242 |
| 2012/0033592 | A1* | 2/2012 | Kim | H04B 7/0452 |
| | | | | 370/310 |

(Continued)

FOREIGN PATENT DOCUMENTS

| | | | | |
|---|---|---|---|---|
| WO | WO2013068834 | | 5/2013 | |
| WO | WO 2013068834 A1 * | | 5/2013 | .......... H04W 72/121 |

OTHER PUBLICATIONS

"Study on Network-Assisted Interference Cancellation and Suppression (NAIC) for LTE (Release 12)", 3GPP TR 36.866 V12.0.1. Mar. 1, 2014, 64 pages.

*Primary Examiner* — Omar Ghowrwal
*Assistant Examiner* — Kokou R Detse
(74) *Attorney, Agent, or Firm* — Davidson Sheehan LLP

(57) ABSTRACT

A first user equipment accesses, based on first information in a first downlink control information (DCI) message addressed to the first user equipment, one or more of a plurality of sets of information indicating pairings for multiuser MIMO from a table stored in the first user equipment. The first user equipment performs interference suppression or cancellation for one or more second user equipment based on information in the one of the plurality of sets.

26 Claims, 7 Drawing Sheets

(56) References Cited

U.S. PATENT DOCUMENTS

2013/0196701 A1* 8/2013 Tiirola ................ H04J 11/0026
455/501

* cited by examiner

INTERFERENCE CANCELLATION AND SUPPRESSION FOR MULTI-USER MULTIPLE-IN/MULTIPLE OUT (MIMO) COMMUNICATION

BACKGROUND

Field of the Disclosure

The present disclosure relates generally to wireless communication and, more particularly, to multi-user MIMO wireless communication.

Description of the Related Art

Wireless communication systems may implement multiple-input/multiple-output (MIMO) techniques to improve communication performance between transmitters and receivers that use multiple antennas for transmission or reception. A single multi-antenna transmitter communicates with a single multi-antenna receiver in single user MIMO (SU-MIMO), whereas the available antennas are spread over multiple transmitter locations and receiver locations in multiple user MIMO (MU-MIMO). A MU-MIMO system can use different spatial channels to concurrently transmit separate signals to different receivers in the same frequency resource. For example, a MU-MIMO base station can concurrently transmit signals in the same frequency resource (such as one or more physical resource blocks) to different user equipment at different locations. In practice, the different spatial channels that are used to transmit the concurrent signals to different user equipment are not perfectly orthogonal and the signals intended for one user equipment interfere with the signals intended for the other user equipment.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for interference cancellation and suppression in a wireless communication system capable of multiuser MIMO transmission. One embodiment of the method includes accessing, based on first information in a first downlink control information (DCI) message addressed to a first user equipment, one or more of a plurality of sets of information indicating pairings for multiuser MIMO from a table stored in the first user equipment. The method also includes performing interference suppression or cancellation for one or more second user equipment based on information in the one of the plurality of sets.

In some embodiments, a method is provided for configuring first user equipment for interference cancellation and suppression in a wireless communication system capable of multiuser MIMO transmission. One embodiment of the method includes transmitting a first message addressed to the first user equipment. The first message includes information indicating a plurality of sets of information indicating at least one potential pairing of a first user equipment with one or more second user equipment for multiuser MIMO. The method also includes, subsequent to transmitting the first message, transmitting a first downlink control information (DCI) message addressed to the first user equipment. The first DCI message includes one or more bits that indicates one or more of the plurality of sets and indicates whether multiuser MIMO is in use.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
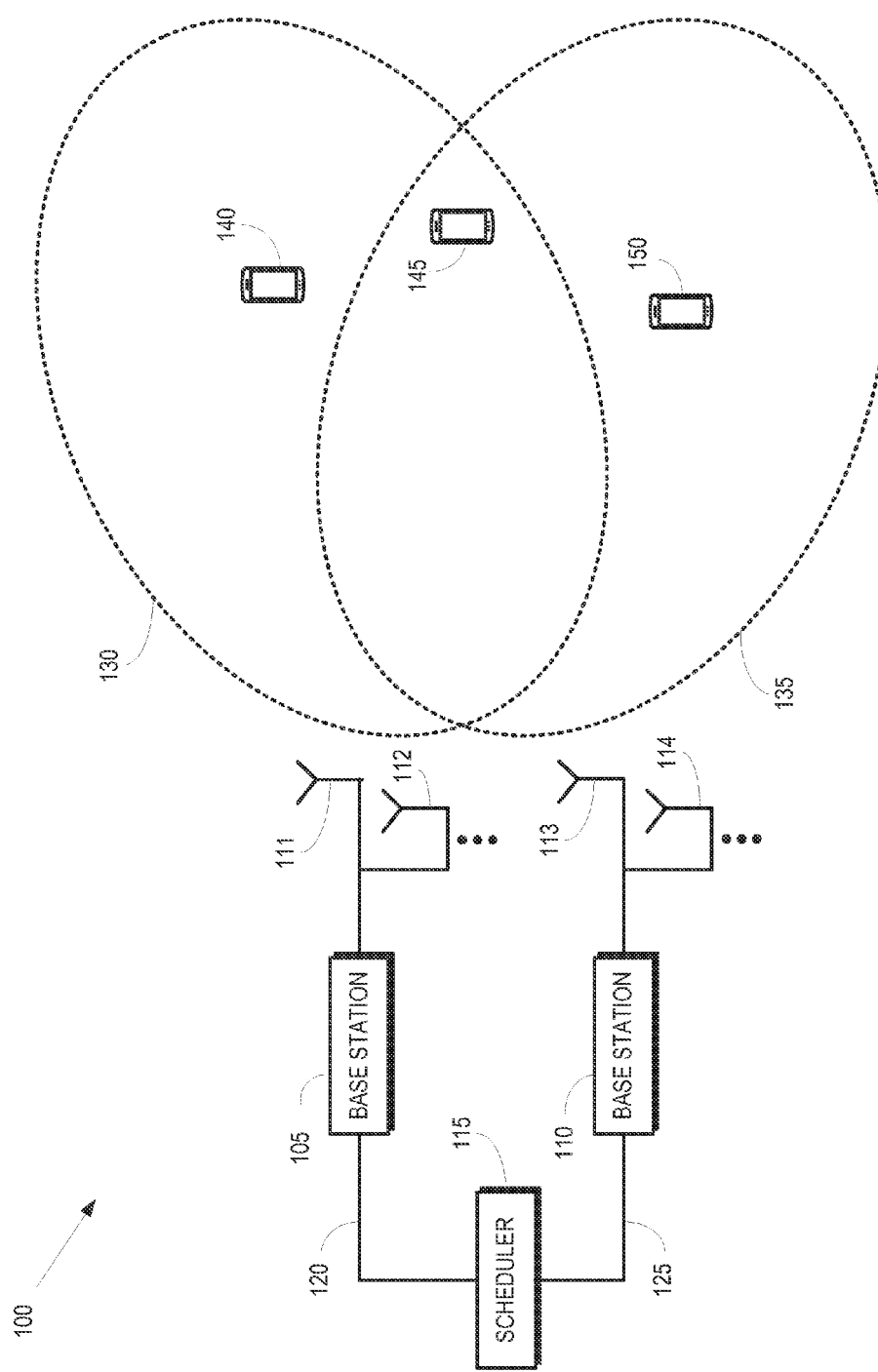
FIG. 1 is a block diagram of an example of a wireless communication system according to some embodiments.

User equipment may suppress or cancel interference from other user equipment in the same frequency resource using information provided by the network, a technique referred to as network-assisted interference cancellation and suppression (NAICS). However, the network assistance information is typically provided to the user equipment semi-statically, e.g., using radio resource control (RRC) messages transmitted on timescales of at least several transmission time intervals (TTIs), because non-ideal backhaul links between the transmitter locations may not be able to convey the information used to characterize interfering transmissions fast enough or accurately enough to support dynamic transmission of network assistance information to the user equipment. This problem is exacerbated by the large amount of information that must be exchanged between transmission locations to support advanced receiver designs such as codeword interference cancellation. For example, user equipment that applies codeword interference cancellation on a per-physical resource block, per-TTI, per user equipment level requires almost full dynamic scheduling information for the physical downlink shared channel (PDSCH) of the interfering user equipment. The scheduling information may include a modulation and coding scheme used by the interfering user equipment, an identifier of the interfering user equipment, a physical resource block allocation, a layer mapping, a demodulation reference signal (DMRS) port mapping, and the like.

User equipment can dynamically acquire scheduling information for one or more interfering user equipment by accessing identifiers of the interfering user equipment and corresponding downlink control information (DCI) search spaces from a pre-provisioned table. Entries in the table may be accessed based on first information in a first DCI message addressed to the user equipment. The user equipment can blindly decode one or more second DCI messages addressed to the interfering user equipment over the corresponding DCI search spaces. The decoded scheduling information for the interfering user equipment may then be used to perform interference suppression or cancellation of signals from the interfering user equipment, e.g., by decoding the physical downlink shared channel (PDSCH) of the interfering user equipment and subtracting the decoded signal from the received signal. A base station can determine values for entries in the pre-provisioned table based on predicted or potential MU-MIMO pairings of the user equipment and the interfering user equipment. The values of the entries may also be determined based on an estimate of the interference level between the user equipment and the interfering user equipment. The base station can provide the pre-provisioned table to the user equipment in RRC signaling prior to transmission of the first or second DCI messages. Some embodiments of the first information included in the first DCI message include one or more bits to identify entries in the pre-provisioned table.

FIG. 1 is a block diagram of an example of a wireless communication system 100 according to some embodiments. The wireless communication system 100 includes one or more base stations 105, 110 that transmit and receive signals over an air interface using a plurality of antennas 111, 112, 113, 114 (collectively referred to herein as "the antennas 111-114"). The antennas 111-114 or subsets thereof may be referred to as antenna arrays or MIMO arrays. The antennas 111-114 may be spread over multiple locations and may therefore support multiple user MIMO (MU-MIMO) to concurrently transmit separate signals to different receivers in the same frequency resource over different, orthogonal or nearly orthogonal, spatial channels.

The base stations 105, 110 may also be connected to a scheduler 115 over backhaul connections 120, 125. Some embodiments of the base stations 105, 110 and the scheduler 115 may be co-located. For example, the base stations 105, 110 and the scheduler 115 may be implemented in the same physical device so that latency of signals transmitted between the base stations 105, 110 and the scheduler 115 is negligible. The backhaul connections 120, 125 in the co-located embodiments may therefore be considered substantially ideal. In other embodiments, one or more of the base stations 105, 110 or the scheduler 115 are distributed among different physical devices deployed at different locations. Latency or non-ideal backhaul connections 120, 125 may limit the amount of information that can be exchanged between the non-co-located base stations 105, 110 and the scheduler 115.

The base stations 105, 110 and the antennas 111-114 may be used to provide wireless connectivity over one or more coverage areas 130, 135. The coverage areas 130, 135 may also be referred to as cells or sectors and some embodiments of the coverage areas 130, 135 may be partially or fully overlapping. Precoding or beamforming techniques may be used to define the direction or opening angle of the coverage areas 130, 135 by applying different weights or phases to signals transmitted or received by the antennas 111-114, e.g., by multiplying a vector representative of signals to be transmitted from the antennas 111-114 by one or more precoding matrices.

User equipment 140, 145, 150 within the coverage areas 130, 135 may communicate with the base stations 105, 110 over the air interface, e.g., over one or more uplink channels or downlink channels. The scheduler 115 may schedule the transmissions over the uplink channels or downlink channels in successive transmission time interval (TTIs) or subframes. Some embodiments of the scheduler 115 can schedule transmissions in frequency resources of the subframes at the granularity of physical resource blocks, which include one or more resource elements defined by a frequency or subcarrier and a time interval or symbol. Each subframe includes a plurality of frequencies or subcarriers and time intervals or symbols. Channels such as the PDSCH may include one or more physical resource blocks in each subframe. Some embodiments of the scheduler 115 may therefore schedule downlink communications to the user equipment 140, 145, 150 in subsets of the physical resource blocks allocated to the PDSCH. Other embodiments of the scheduler 115 may be an assisting scheduler that may provide information for configuring the base stations 105, 110, e.g., using radio resource control (RRC) signaling, so that the base stations 105, 110 may schedule downlink transmissions as discussed herein.

The base stations 105, 110 may operate in a MU-MIMO mode in which they can concurrently transmit signals in the same frequency resource (such as one or more physical resource blocks) to different user equipment at different locations. For example, the base stations 105, 110 may concurrently transmit signals to more than one user equipment 140, 145, 150 in the same physical resource block or same set of physical resource blocks. Spatial diversity between the air interface channels from the antennas 111-114 to the user equipment 140, 145, 150 provides orthogonality between the concurrent signals. When the base stations 105, 110 are operating in MU-MIMO mode, the scheduler 115 may "pair" two or more of the user equipment 140, 145, 150 for concurrent downlink transmissions in the same physical resource blocks. As used herein, the term "pair" refers to associating two or more user equipment so that the "paired" user equipment may be scheduled together for concurrent downlink transmissions in the same physical resource blocks. For example, in some implementations of MU-MIMO, up to four different user equipment may be "paired" for concurrent downlink transmissions in the same physical resource blocks of the same subframe.

Pairings (or changes in the pairings) may be determined based on feedback, interference levels, characteristics or capabilities of the user equipment 140, 145, 150, or combinations thereof. Some embodiments of the scheduler 115 pair the user equipment 140, 145, 150 based on feedback received from the user equipment 140, 145, 150. For example, the scheduler 115 may perform pairing based on a precoding matrix indicator (PMI) received from one or more of the user equipment 140, 145, 150 in each subframe. For another example, the scheduler 115 may perform pairing based on longer timescale feedback indicating a measured value of a reference signal received power (RSRP) received from one or more of the user equipment 140, 145, 150. The feedback may be used to estimate the interference between the user equipment 140, 145, 150 and the estimated interference level may be used to determine whether to pair one or more of the user equipment 140, 145, 150. Some embodiments of the scheduler 115 pair the user equipment 140, 145, 150 based on the interference cancellation or suppression capabilities of the user equipment 140, 145, 150. For example, the scheduler 115 may pair larger numbers of user equipment 140, 145, 150 to the same resources if the user equipment 140, 145, 150 supports advanced techniques such as codeword interference cancellation. The scheduler 115 may pair smaller numbers of user equipment 140, 145, 150 if the user equipment 140, 145, 150 support less advanced techniques such as minimum mean square error (MMSE) estimation with interference rejection combining (IRC). Some embodiments of the scheduler 115 may determine or modify pairings of the user equipment 140, 145, 150 on a per-subframe basis so that the pairings may change from subframe to subframe.

The spatial channels that are used to transmit the concurrent signals to the paired user equipment 140, 145, 150 may not be perfectly orthogonal and the signals intended for the paired user equipment 140, 145, 150 may interfere with each other. The user equipment 140, 145, 150 may therefore perform interference suppression or cancellation to remove some or all of the interfering signals received from other user equipment 140, 145, 150. The interference suppression or cancellation may be performed based on stored information indicating potential pairings of the user equipment 140, 145, 150. The stored information may be generated and provided by the scheduler 115. For example, the scheduler 115 may determine (based on feedback or capabilities) that the user equipment 140 is likely to be paired with the user equipment 145 or the user equipment 150. The scheduler 115 may transmit a message to the user equipment 140 including information indicating different potential pairings with the user equipment 145, 150. For example, the message may be a radio resource control (RRC) message that includes information indicating a first set for a pairing of the user equipment 140 and the user equipment 145, a second set for a pairing of the user equipment 140 and both the user equipment 145, 150, and a third set for a pairing of the user equipment 140 and the user equipment 150. The RRC message may also include information indicating that the base stations 105, 110 are not using MU-MIMO for downlink transmissions to the user equipment 140. For example, the information may indicate a fourth set in which the user equipment 140 is not paired with any other user equipment.

The base stations 105, 110 may subsequently use a downlink control information (DCI) message addressed to the user equipment 140 to indicate the pairing that is in effect for the subframe used to transmit the DCI message. For example, the DCI message may include one or more bits that indicate one of the sets of pairings that were previously transmitted to the user equipment 140. The values of the bits in the DCI message may therefore indicate whether the base stations 105, 110 are using MU-MIMO and, if so, which user equipment are paired with the user equipment 140. For example, if the values of the bits in the DCI message indicate the first set, then the base stations 105, 110 are using MU-MIMO and the user equipment 140 is paired with the user equipment 145 in the subframe used to transmit the DCI message. For another example, if the values of the bits in the DCI message indicate the fourth set, then the base stations 105, 110 are not using MU-MIMO and the user equipment 140 is not paired with any other user equipment in the subframe used to transmit the DCI message.

The RRC message received from the base stations 105, 110 may also include additional information to facilitate interference cancellation or suppression. Some embodiments of the RRC message include information identifying the paired user equipment, a DCI search space associated with the paired user equipment, and a cell identifier associated with the paired user equipment. For example, the RRC message indicating the first set for the pairing of the user equipment 140 and the user equipment 145 may also include an identifier of the user equipment 145, a DCI search space for DCI messages addressed to the user equipment 145, and a cell identifier for one of the coverage areas 130, 135 associated with the user equipment 145. In some embodiments, the RRC message may include information determined based on the capabilities of the user equipment. For example, if the user equipment 140 implements successive interference cancellation, the RRC message may include information identifying a modulation and coding scheme used by the paired user equipment.

The user equipment 140 may store the information received from the base stations 105, 110 and subsequently use this information to acquire dynamic scheduling information from DCI messages addressed to paired user equipment. For example, if the DCI message addressed to the user equipment 140 indicates the first set, the user equipment 140 may perform blind decoding of DCI messages addressed to the user equipment 145 over the DCI search space indicated in the stored information. The decoded DCI messages may include full scheduling information for downlink signals addressed to the user equipment 145 and may be therefore be used for interference cancellation on a subframe-by-subframe basis. For example, the user equipment 140 may use codeword interference cancellation to cancel interference from the user equipment 145 on the basis of the scheduling information acquired from the decoded DCI messages.

Figure 2:
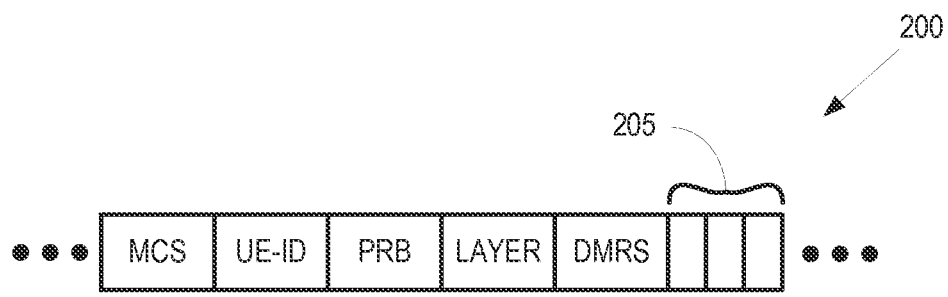
FIG. 2 is a diagram of a downlink control information (DCI) message according to some embodiments.

FIG. 2 is a diagram of a downlink control information (DCI) message 200 according to some embodiments. Some embodiments of the DCI message 200 include fields indicating resources used to encode downlink transmissions. For example, the DCI message 200 may include a field (MCS) for a value indicating a modulation and coding scheme used for modulating and encoding downlink transmissions in the subframe including the DCI message 200. The DCI message 200 also includes a field (UE-ID) for a value identifying the user equipment that is to receive the DCI message 200, a field (PRB) for a value indicating an allocation of physical resource blocks to the downlink channels such as the PDSCH, a field (LAYER) for a value indicating a layer mapping, and a field (DMRS) for a value indicating a demodulation reference signal port mapping. For another example, the DCI message 200 may be based on a legacy DCI message that includes an MCS field, a PRB field, and a field that jointly encodes the LAYER/DMRS information. The legacy DCI message may not include a field for identifying the user equipment.

Some embodiments of the DCI message 200 also include one or more fields that include values that indicate whether MU-MIMO is in use during the subframe including the DCI message 200. For example, the DCI message 200 may include one or more bits 205 that can be used to identify one or more of a plurality of sets that were previously stored by the user equipment. As discussed herein, the sets may identify pairings of user equipment and other information such as DCI search spaces for DCI messages addressed to the paired user equipment. If the values of the bits 205 indicate one or more sets that identify one or more paired user equipment, the user equipment that decodes the DCI message 200 may determine that MU-MIMO is in use during the subframe including the DCI message 200. However, if the values of the bits 205 indicate a set that does not identify any paired user equipment, or has a null value of one or more fields, the user equipment that decodes the DCI message 200 may determine that MU-MIMO is not in use during the subframe including the DCI message 200.

Figure 3:
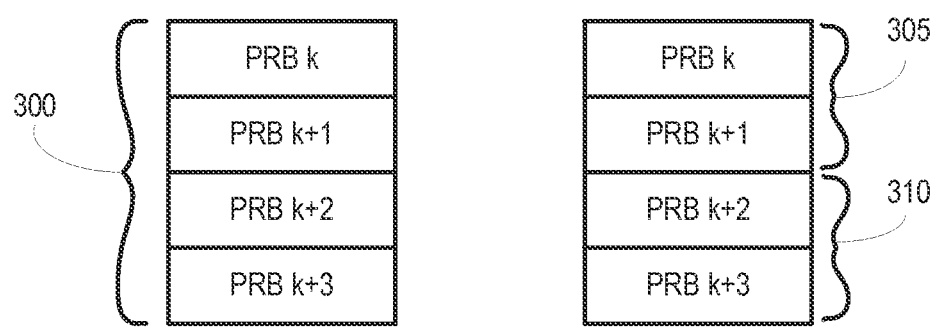
FIG. 3 is a diagram of an allocation of physical resource blocks to different user equipment for MU-MIMO downlink transmissions according to some embodiments.

FIG. 3 is a diagram of an allocation of physical resource blocks to different user equipment for MU-MIMO downlink transmissions according to some embodiments. The set 300 of physical resource blocks PRB k, PRB k+1, PRB k+2, PRB k+3 are allocated for downlink transmission to a first user equipment such as the user equipment 140 shown in FIG. 1. The set 305 of physical resource blocks PRB k, PRB k+1 are allocated for downlink transmission to a second user equipment such as the user equipment 145 shown in FIG. 1. The set 310 of physical resource blocks PRB k+2, PRB k+3 are allocated for downlink transmission to a third user equipment such as the user equipment 150 shown in FIG. 1. In the interest of clarity, the set 300 is depicted to the left of the sets 305, 310. However, both depictions refer to the same physical resource blocks in the same subframe. For example, the physical resource block PRB k on the left-hand side is the same as the physical resource block PRB k on the right-hand side of FIG. 3. The first and second user equipment may therefore interfere with each other in the physical resource blocks of the set 305, and the first and third user equipment may interfere with each other in the physical resource blocks of the set 310.

A scheduler, such as the scheduler 115 shown in FIG. 1, schedules downlink transmissions to the first, second, and third user equipment. The scheduler is therefore aware of the MU-MIMO pairings of the different user equipment in the sets 300, 305, 310 of physical resource blocks. The scheduler may generate information indicating the potential pairings of the first, second, and third user equipment for each physical resource block that is allocated for downlink transmission during one or more subframes. As discussed herein, this information is provided to the user equipment, e.g., in one or more RRC messages transmitted by base stations such as the base stations 105, 110 shown in FIG. 1.

Figure 4:
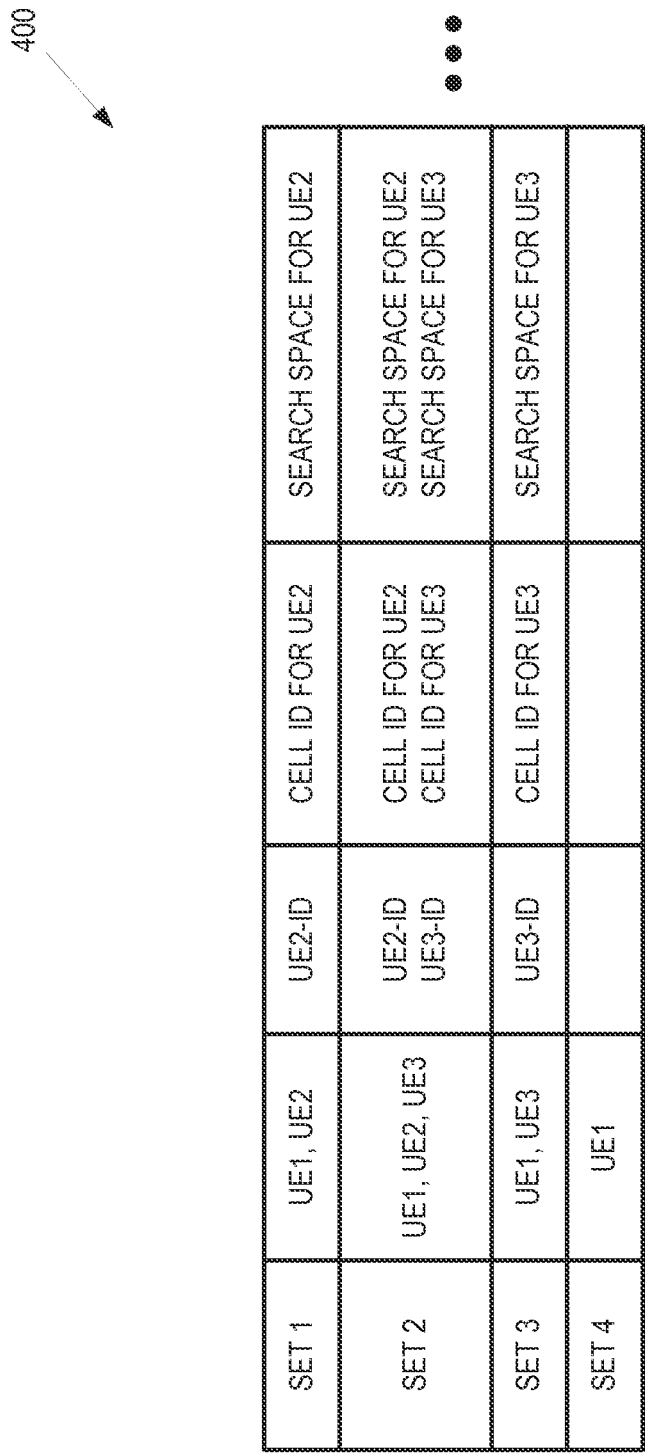
FIG. 4 is a diagram of a table for storing information identifying sets of pairings of user equipment for MU-MIMO downlink transmissions according to some embodiments.

FIG. 4 is a diagram of a table 400 for storing information identifying sets of pairings of user equipment for MU-MIMO downlink transmissions according to some embodiments. The table 400 may be stored as a data structure in one or more user equipment such as the user equipment 140, 145, 150 shown in FIG. 1. Values of the entries in the table 400 may be determined based on information provided to the user equipment, e.g., in one or more RRC messages transmitted by base stations such as the base stations 105, 110 shown in FIG. 1. The table 400 includes a first column to store values of one or more sets, a second column to store values identifying paired user equipment in the sets, a third column to store values of identifiers of the paired user equipment, a fourth column to store values of cell identifiers for the paired user equipment, and a fifth column to store values indicating a search space in DCI messages for the paired user equipment. Some embodiments of the table 400 may also include additional information not shown in FIG. 4.

Rows of the table 400 include the corresponding information for different sets of paired user equipment. For example, the scheduler may determine that the second user equipment is the dominant interferer for the first user equipment during some subframes of MU-MIMO. The scheduler may therefore provide information to configure the table 400 so that the first row includes a first field to store a value indicating Set 1, a second field to store a value indicating a pairing of the first user equipment (UE1) with the second user equipment (UE2), a third field to store a value identifying the second user equipment (UE2-ID), a fourth field to store a value indicating a cell identifier for the second user equipment, and a fifth field to store a value indicating a search space for DCI messages addressed to the second user equipment. The scheduler may also determine that the first user equipment is able to perform codeword interference cancellation on both the second user equipment and the third user equipment during some subframes of MU-MIMO. Values of fields in the second row may therefore be configured accordingly. The scheduler may further determine that the second user equipment may not cause significant interference (e.g., due to orthogonal PMI or limited physical resource block usage) so that the third user equipment is the dominant interferer during some subframes of MU-MIMO and the third row may be configured accordingly. There may be no MU-MIMO transmission (or a negligible level of interference from other user equipment) during other subframes and the fourth row may be configured accordingly.

The values in the fields of the table 400 indicate whether MU-MIMO is in use. For example, fields in the first three rows of the table 400 include information identifying pairings of the different user equipment. Consequently, the non-NULL values in these fields also indicate that MU-MIMO is in use for the specified pairings of the user equipment. Thus, decoded DCI information, such as the bits 205 shown in FIG. 2, that indicates the first, second, or third row in the table 400 provides an indication to the user equipment that MU-MIMO is in use during the subframe including the decoded DCI information. For another example, the second field of the fourth row includes a value that only indicates the first user equipment and does not indicate a pairing with any of the user equipment. Moreover, the third, fourth, and fifth field of the fourth row include NULL values, which indicates that MU-MIMO is not in use for the first user equipment. Thus, decoded DCI information that indicates the fourth row in the table 400 provides an indication to the first user equipment that MU-MIMO is not in use during the subframe including the decoded DCI information.

Once the table 400 has been configured in the user equipment, the scheduler can dynamically indicate one of the sets, e.g., using DCI messages transmitted to the user equipment, as discussed herein. For example, the scheduler may determine which set to indicate based on feedback received from the user equipment and instantaneous scheduling decisions for all of the user equipment being scheduled by the scheduler. Some embodiments of the user equipment may ignore the information provided by the scheduler, e.g., if the user equipment does not have sufficient capability to perform blind decoding of the DCI messages of other user equipment or to perform advanced interference cancellation techniques such as codeword interference cancellation.

In some cases, the user equipment may be paired and scheduled for MU-MIMO with one or more interfering user equipment that are not indicated in the table 400. The user equipment and the scheduler may therefore fall back to conventional operation without network assistance for interference cancellation or suppression. The criteria for pairing user equipment may be significantly relieved if user equipment can effectively cancel interference during MU-MIMO, which may allow this scenario to be avoided.

Figure 5:
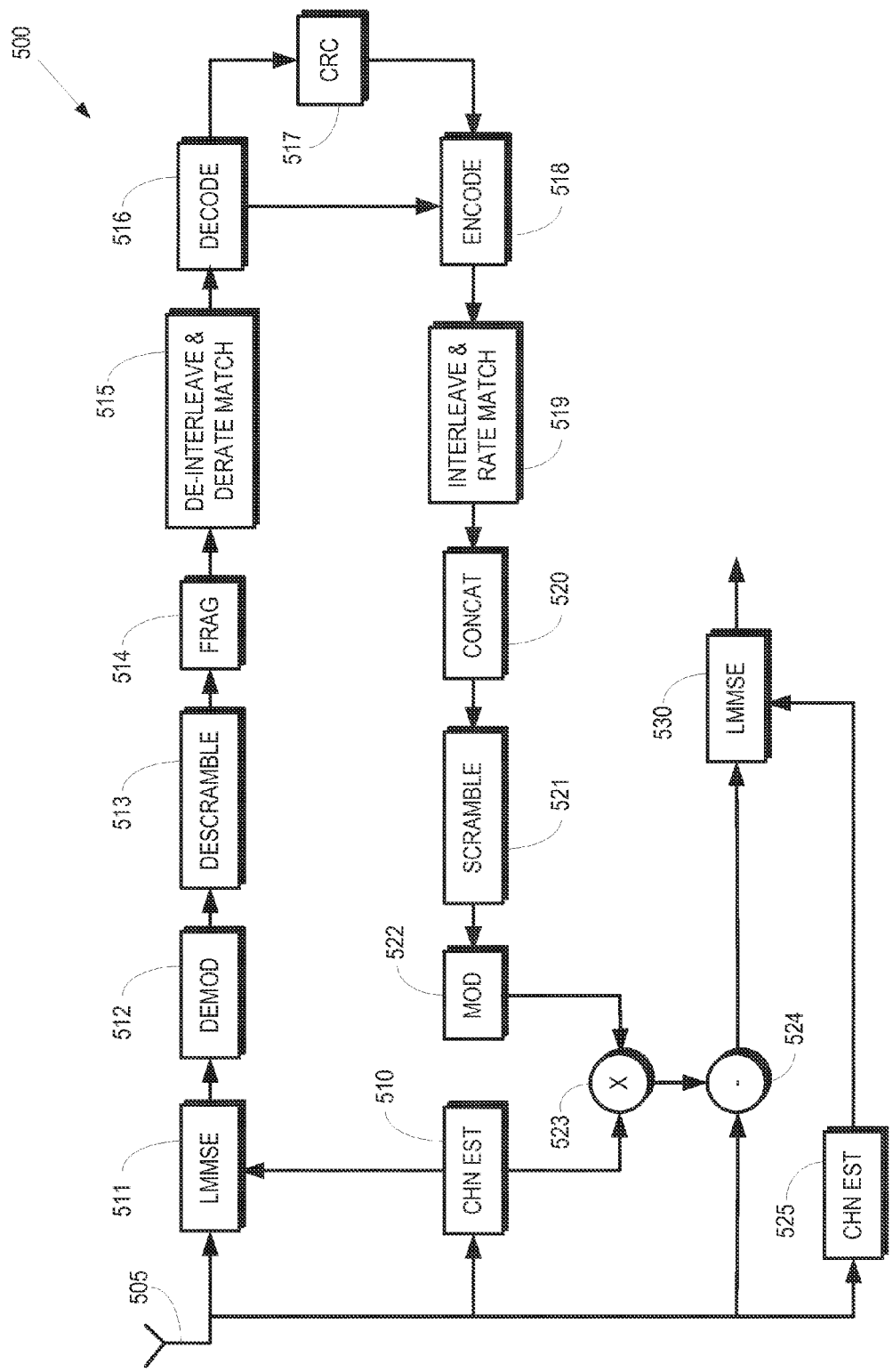
FIG. 5 is a block diagram of user equipment that implements codeword interference cancellation according to some embodiments.

FIG. 5 is a block diagram of user equipment 500 that implements codeword interference cancellation according to some embodiments. The user equipment 500 includes one or more antennas 505 that receive signals over the air interface such as downlink transmissions in physical resource blocks that are shared with other (interfering) user equipment during MU-MIMO. Signals from the antenna 505 are provided to a channel estimator (CHN EST) 510 that estimates spatial channels for signals transmitted to the interfering user equipment. Signals from the antenna 505 are also provided to a linear minimum mean squared error (LMMSE) estimator 511 to estimate the modulated signals transmitted to the interfering user equipment based on the spatial channels determined by the channel estimator 510. The estimated signals are demodulated by a demodulator 512 and the demodulated signals are descrambled (e.g., using the identifier of the interfering user equipment or other scrambling code) by the descrambler 513. A fragmenter 514 fragments the descrambled signals, which are then de-interleaved and de-rate matched at the logic block 515. The signals generated by the logic block 515 may then be decoded by decoder 516 to retrieve values of the information transmitted to the interfering user equipment.

A cyclic redundancy check (CRC) may be performed in the logic block 517 to determine whether the decoded information includes any errors. If so, the decoded message may not be used for subsequent interference cancellation. However, if the decoded message passes the CRC check in the logic block 517, the decoded message may be encoded by an encoder 518, interleaved and rate matched at the logic block 519, concatenated at the logic block 520, scrambled (e.g. using the identifier of the interfering user equipment or other scrambling code) by the scrambler 521, and modulated at the modulator 522 to produce an encoded signal that corresponds to the signal generated by the base station for transmission over the air interface to the interfering user equipment.

A multiplier 523 may multiply a vector representing the encoded signal by a matrix representing the estimated channel produced by the channel estimator 510 to produce a signal representative of the interfering portion of the signal received at the antenna 505. The signal provided by the multiplier 523 is subtracted (at the subtractor 524) from the signal received by the antenna 505 to cancel interference produced by the signals transmitted to the interfering user equipment. Signals from the antenna 505 are provided to a channel estimator (CHN EST) 525 that estimates spatial channels for signals transmitted to the user equipment 500. The signals produced by the subtractor 524, i.e., the interference-canceled signals, are provided to a LMMSE estimator 530 to estimate the modulated signals transmitted to the user equipment 500 based on the spatial channels determined by the channel estimator 525. The signals produced by the LMMSE estimator 530 may then be demodulated and decoded to retrieve the information in the message transmitted to the user equipment 500.

Figure 6:
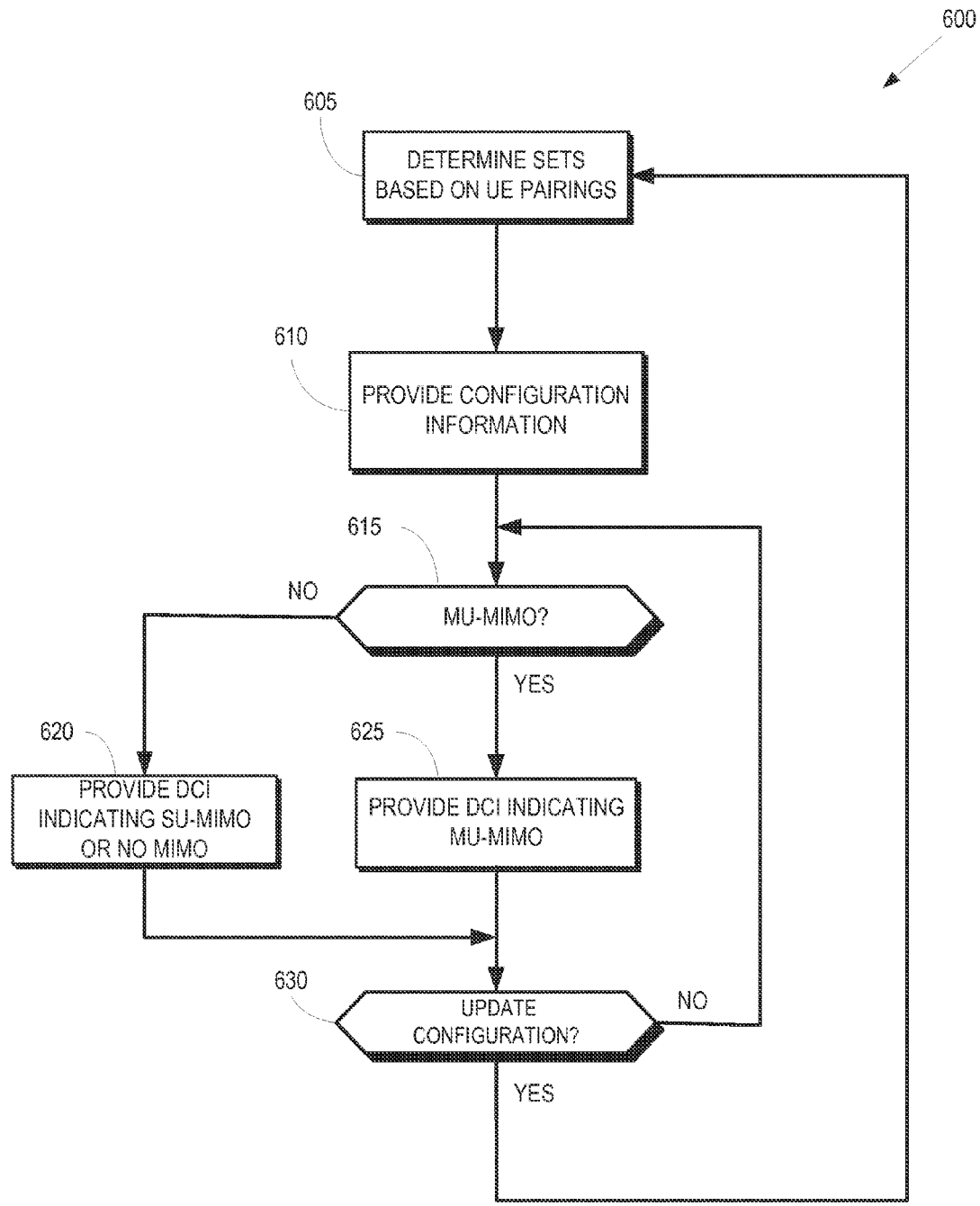
FIG. 6 is a flow diagram of a method for providing configuration information to user equipment for interference cancellation or suppression according to some embodiments.

FIG. 6 is a flow diagram of a method 600 for providing configuration information to user equipment for interference cancellation or suppression according to some embodiments. The method 600 may be implemented in some embodiments of the base stations 105, 110 or the scheduler 115 shown in FIG. 1. At block 605, the scheduler determines sets that indicate potential pairings of a first user equipment with one or more second (interfering) user equipment for MU-MIMO downlink transmissions in the subsequent subframes. As discussed herein, the potential pairings may be determined based on feedback from the first or second user equipment, estimates of interference between the first and second user equipment, capabilities of the first or second user equipment, and the like. At block 610, configuration information that indicates the sets of potential pairings is provided to the first user equipment. For example, one or more base stations may transmit the configuration information generated by the scheduler to the first user equipment in one or RRC messages. The first user equipment may store the configuration information, e.g., in a table, for subsequent use during interference cancellation or suppression.

At decision block 615, the scheduler determines whether MU-MIMO is to be used for downlink transmissions in one or more physical resource blocks of a subframe. If not, one or more base stations transmits (at block 620) a DCI message including information indicating that MU-MIMO is not being used in physical resource blocks of the subframe including the DCI message. As discussed herein, the information in the DCI message may include one or more bits that indicate one of the plurality of sets that does not indicate a pairing of the first user equipment or includes NULL values of one or more fields. The first user equipment may therefore operate as if SU-MIMO is being used or no MIMO is being used at all. If MU-MIMO is use for downlink transmission in one or more physical resource blocks of the subframe, the base stations transmit (at block 625) a DCI message including information indicating that MU-MIMO is being used in physical resource blocks of the subframe including the DCI message. As discussed herein, the information in the DCI message may include one or more bits that indicate a set including information identifying pairing of the first user equipment with one or more second user equipment. The method 600 may iterate the operations in blocks 615, 620, 625 for each successive subframe transmitted by the base stations.

At decision block 630, the scheduler may determine that the configuration of the sets that are stored in the user equipment is to be changed. For example, the scheduler may determine that the potential pairings of the first user equipment with one or more second user equipment has changed due to changes in feedback from the first or second user equipment, estimates of interference between the first and second user equipment, capabilities of the first or second user equipment, and the like. If so, the method 600 may flow to block 605 and the scheduler may re-determine the sets of configuration information based on the new pairings of the user equipment. Updates may be performed on timescales corresponding to timescales for transmission of RRC messages, e.g., several subframes.

Figure 7:
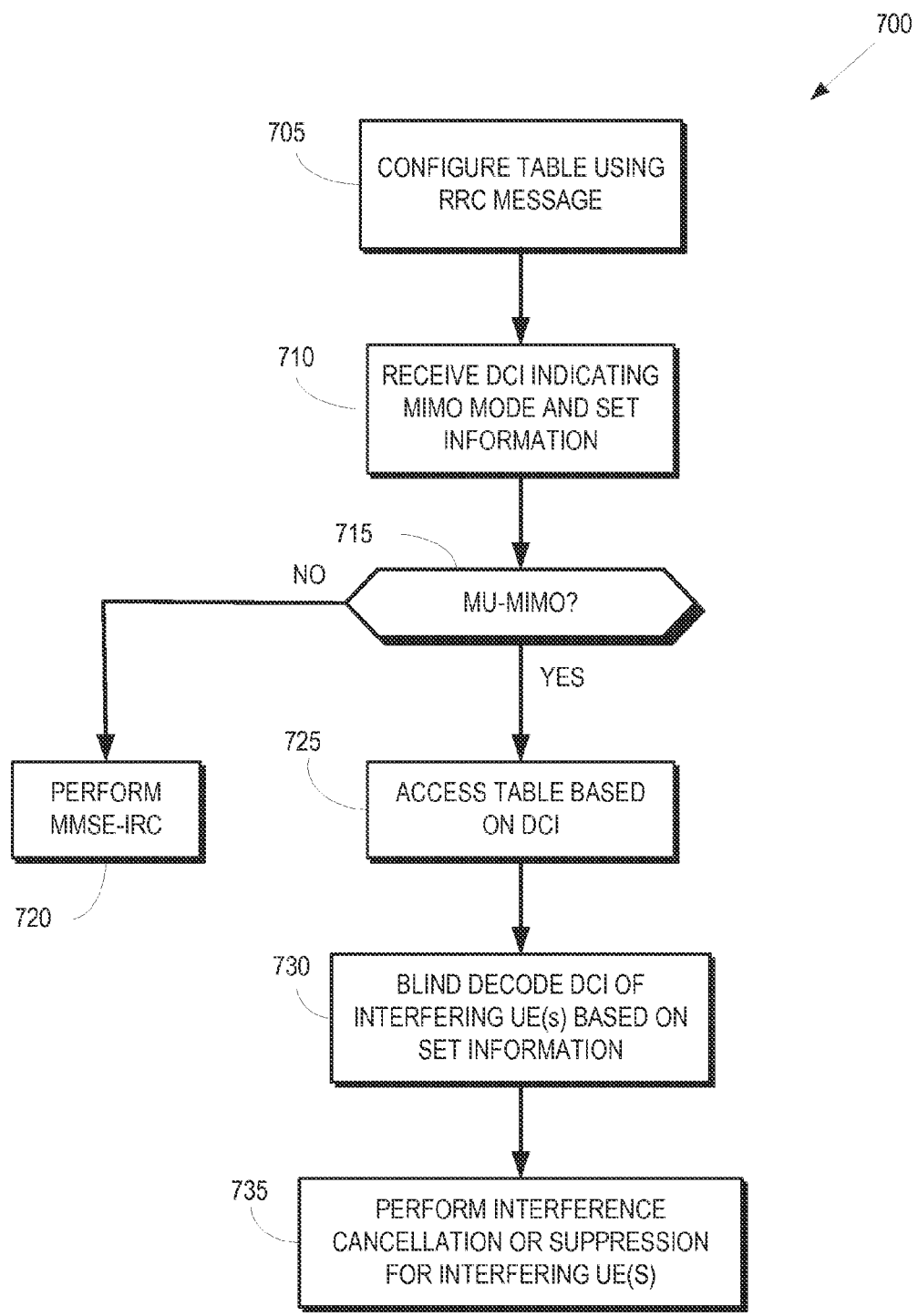
FIG. 7 is a flow diagram of a method for configuring user equipment for interference cancellation or suppression according to some embodiments.

FIG. 7 is a flow diagram of a method 700 for configuring user equipment for interference cancellation or suppression according to some embodiments. The method 700 may be implemented in some embodiments of the user equipment 140, 145, 150 shown in FIG. 1. At block 705, user equipment receives information in an RRC message from one or more base stations and uses this information to configure a table (or other data structure) to include information representing a plurality of sets of pairings of the user equipment with one or more interfering user equipment. At block 710, the user equipment receives a DCI message including information indicating the MIMO mode (e.g., single user or multiuser) in use during the subframe including the DCI message. As discussed herein, the information in the DCI message may include one or more bits that indicates one of the plurality of sets of pairings stored in the table of the user equipment.

At decision block 715, the user equipment determines whether MU-MIMO is in use for downlink transmissions in one or more physical resource blocks during the subframe including the DCI message. If not, the user equipment may not use a network-assisted interference cancellation or suppression method and may instead use less advanced techniques such as MMSE-IRC (at block 720) interference from interfering user equipment. If the information in the DCI message indicates that MU-MIMO is being used during the subframe including the DCI message, the user equipment may use the information in the DCI message to access (at block 725) the table that includes the plurality of sets of user equipment pairings. For example, the user equipment may use one or more bits in the DCI message to identify one of the plurality of sets, which may include information identifying a search space in one or more DCI messages of one or more interfering user equipment.

At block 730, the user equipment blindly decodes DCI messages addressed to one or more interfering user equipment over the search spaces indicated in the DCI message. Some embodiments of the user equipment may successfully decode one or more DCI messages addressed to one or more interfering user equipment and may retrieve dynamic scheduling information for the interfering user equipment from the decoded DCI message. Examples of the dynamic scheduling information include a modulation and coding scheme used for modulating and encoding downlink transmissions in the subframe including the DCI message, an identifier of the user equipment that is to receive the DCI message, an allocation of physical resource blocks to the downlink channels, a layer mapping, and a demodulation reference signal port mapping. At block 735, the user equipment performs interference cancellation or suppression for the interfering user equipment using the scheduling information retrieved from the decoded DCI message addressed to the interfering user equipment. Some embodiments of the method 700 may iterate blocks 710, 715, 720, 725, 730, 735 in each successive subframe based on the DCI message received in that subframe.

Figure 8:
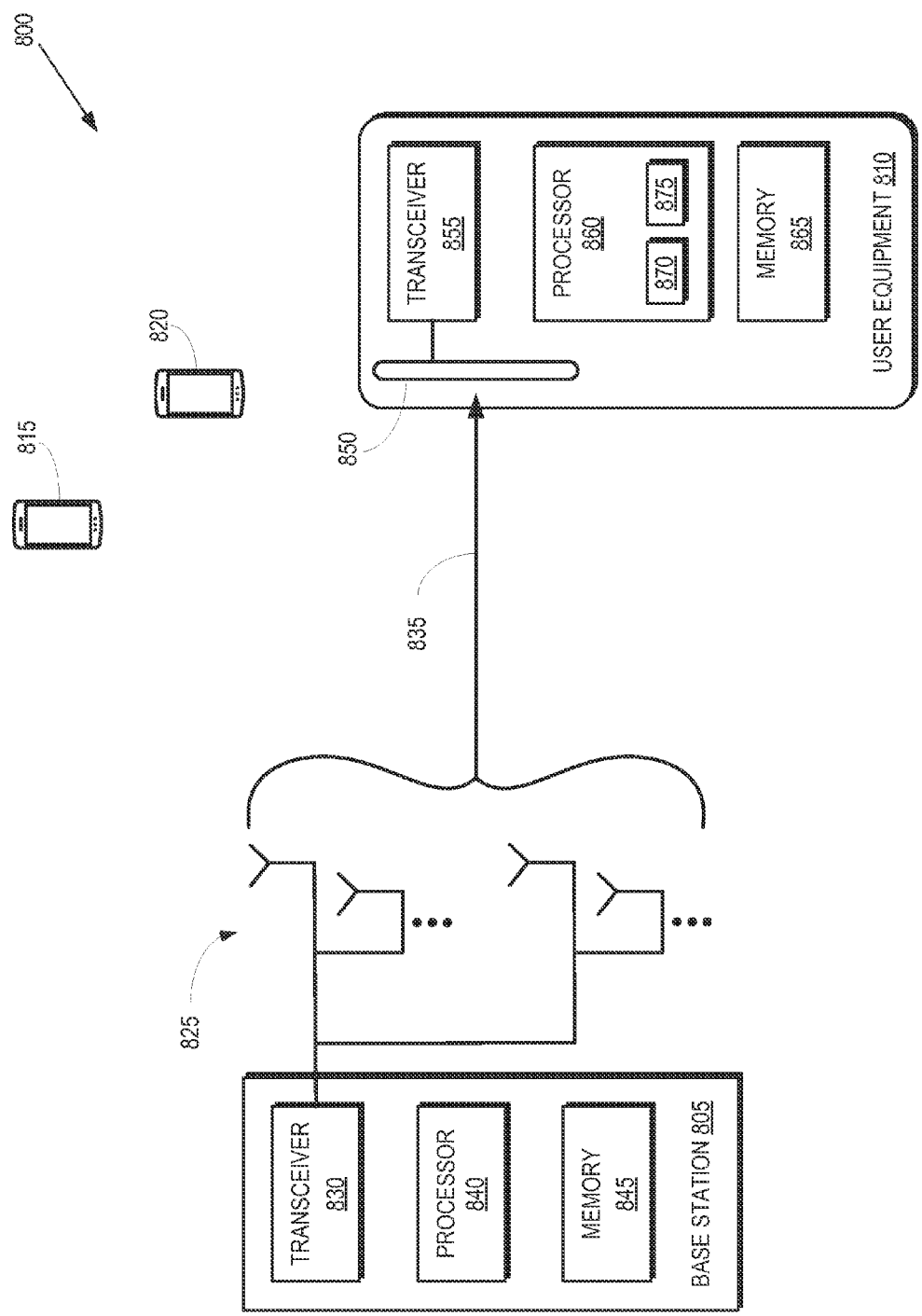
FIG. 8 is a block diagram of an example of a wireless communication system according to some embodiments.

FIG. 8 is a block diagram of an example of a wireless communication system 800 according to some embodiments. The wireless communication system 800 includes a base station 805 for scheduling downlink transmissions to one or more user equipment 810, 815, 820. Some embodiments of the base station 805 may be used to implement one or more of the base stations 105, 110 shown in FIG. 1. The base station 805 is connected to a MIMO antenna array 825 and may implement a scheduler such as the scheduler 115 shown in FIG. 1. However, some embodiments of the scheduler may be implemented as a separate entity that is connected to the base station 805 by a backhaul connection, as discussed herein. Some embodiments of the user equipment 810, 815, 820 may be used to implement the user equipment 140, 145, 150 shown in FIG. 1.

The base station 805 includes a transceiver 830 for transmitting downlink signals over an air interface 835. The base station 805 also includes a processor 840 and a memory 845. The processor 840 may be used to execute instructions stored in the memory 845 and to store information in the memory 845 such as the results of the executed instructions. Some embodiments of the base station 805 may implement the method 600 shown in FIG. 6 to configure the user equipment 810 to perform network-assisted interference cancellation or suppression based on pre-provisioned information identifying user equipment pairings and DCI messages that include information indicating one of the user pairings on a per-subframe basis.

The user equipment 810 includes one or more antennas 850 that are coupled to a transceiver 855 for receiving downlink signals over the air interface 835. The user equipment 810 also includes a processor 860 and a memory 865. The processor 860 may be used to execute instructions stored in the memory 865 and to store information in the memory 865 such as the results of the executed instructions. Some embodiments of the processor 860 implement multiple modules 870, 875 for performing interference cancellation or suppression. For example, the module 870 may implement a less advanced interference cancellation or suppression algorithm such as MMSE-IRC or successive interference cancellation. The module 875 may implement a more advanced interference cancellation and suppression algorithm such as codeword interference cancellation, as shown in FIG. 5. Some embodiments of the processor 860 may implement the method 700 shown in FIG. 7 to perform interference cancellation or suppression using a selected one of the modules 870, 875 based on information identifying user equipment pairings (which may be stored in the memory 865 as a table such as the table 400 shown in FIG. 4) and DCI messages received by the transceiver 855 that include information indicating one of the user pairings.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
accessing, based on first information in a first downlink control information (DCI) message received by a first user equipment, an indicated one of a plurality of sets of information from a table stored in the first user equipment, wherein each of the sets includes at least one identifier of at least one second user equipment that is paired with the first user equipment for multiuser MIMO, wherein the at least one second user equipment is in a plurality of second user equipment, and wherein the sets indicate different pairings between the first user equipment and different subsets of the plurality of second user equipment; and
performing at least one of interference suppression and cancellation for the at least one second user equipment based on information in the indicated one of the plurality of sets.

2. The method of claim 1, further comprising:
decoding the first DCI message at the first user equipment, and wherein the first information comprises at least one bit that indicates whether multiuser MIMO is in use.

3. The method of claim 2, wherein the at least one bit has a value that indicates that the first user equipment is paired with the at least one second user equipment for multiuser MIMO.

4. The method of claim 3, wherein the indicated one of the plurality of sets comprises the at least one identifier of the at least one second user equipment, information indicating at least one DCI search space for the at least one second user equipment, and a cell identifier associated with the at least one second user equipment.

5. The method of claim 4, further comprising:
decoding at least one second DCI message over the at least one DCI search space.

6. The method of claim 5, wherein performing at least one of interference suppression and cancellation comprises performing at least one of interference suppression and cancellation based on scheduling information for at least one downlink shared channel of the at least one second user equipment, wherein the scheduling information is included in the at least one second DCI message.

7. The method of claim 6, wherein performing at least one of interference suppression and cancellation based on the scheduling information comprises performing at least one of interference suppression and cancellation based on at least one of a modulation and coding scheme, a user equipment identifier, an allocation of physical resource blocks, a layer mapping, and a demodulation reference symbol port mapping included in the scheduling information.

8. The method of claim 7, wherein performing at least one of interference suppression and cancellation comprises performing codeword interference cancellation for the at least one second user equipment based on the scheduling information.

9. The method of claim 2, further comprising:
determining that multiuser MIMO is not in use in response to the indicated one of the plurality of sets having a null value for the at least one identifier of the at least one second user equipment, information indicating at least one DCI search space for the at least one second user equipment, and a cell identifier associated with the at least one second user equipment.

10. The method of claim 1, further comprising:
configuring the table based upon information included in at least one radio resource control (RRC) message.

11. The method of claim 1, further comprising:
receiving, at the first user equipment, a radio resource control (RRC) message from a base station;
configuring the table based on information in the RRC message;
receiving the first DCI message from the base station, wherein the first DCI message includes information indicating whether multiuser MIMO is in use, and wherein the first DCI message includes information identifying a search space in at least one second DCI message addressed to the at least one second user equipment;
decoding scheduling information over the search space of the at least one second DCI message; and
performing interference cancellation or suppression for the at least one second user equipment based on the scheduling information retrieved from the at least one second DCI message by decoding at least one physical downlink shared channel (PDSCH) of the at least one second user equipment and subtracting the decoded PDSCH signal from at least one signal received from the at least one second user equipment.

12. A method comprising:
transmitting a first message addressed to first user equipment, the first message comprising information indicating a plurality of sets of information, wherein each of the sets includes at least one identifier of at least one second user equipment that is available for pairing with the first user equipment for multiuser MIMO, wherein the at least one second user equipment is in a plurality of second user equipment, and wherein the sets indicate different pairings between the first user equipment and different subsets of the plurality of second user equipment; and
subsequent to transmitting the first message, transmitting a first downlink control information (DCI) message addressed to the first user equipment, wherein the first DCI message comprises at least one bit that indicates an indicated one of the plurality of sets and indicates whether multiuser MIMO is in use.

13. The method of claim 12, further comprising:
determining a pairing of the first user equipment with the at least one second user equipment for multiuser MIMO based on interference suppression or cancellation capabilities of the first user equipment and the at least one second user equipment.

14. The method of claim 12, further comprising:
determining the pairing of the first user equipment with the at least one second user equipment for multiuser MIMO based on at least one of a measured value of a reference signal received power or a received value of a precoding matrix indicator associated with the first user equipment and the at least one second user equipment.

15. The method of claim 12, wherein transmitting the first message comprises transmitting a first radio resource control (RRC) message.

16. The method of claim 12, wherein transmitting the first DCI message comprises transmitting the first DCI message as one of a plurality of DCI messages that are transmitted in successive transmission time intervals.

17. The method of claim 12, wherein transmitting the first DCI message comprises transmitting at least one bit having a value that indicates that the first user equipment is paired with the at least one second user equipment for multiuser MIMO.

18. The method of claim 17, wherein transmitting the first DCI message comprises transmitting the at least one bit having a value that indicates the indicated one of the plurality of sets, wherein the indicated one of the plurality of sets comprises the at least one identifier of the at least one second user equipment, at least one DCI search space for the at least one second user equipment, and a cell identifier associated with the at least one second user equipment.

19. The method of claim 12, wherein transmitting the first DCI message comprises transmitting at least one bit having a value that indicates that the first user equipment is not paired with the at least one second user equipment for multiuser MIMO.

20. The method of claim 19, wherein transmitting the first DCI message comprises transmitting the at least one bit having a value that indicates the indicated one of the plurality of sets, and wherein the indicated one of the plurality of sets comprises a null value for the at least one identifier of the at least one second user equipment, at least one DCI search space for the at least one second user equipment, and a cell identifier associated with the at least one second user equipment.

21. The method of claim 12, further comprising:
transmitting a second DCI message addressed to the second user equipment.

22. The method of claim 12, further comprising:
determining the plurality of sets of information based on at least one of feedback from the first user equipment or the at least one second user equipment, at least one estimate of interference between the first user equipment and the at least one second user equipment, or capabilities of the first user equipment or the at least one second user equipment;
determining whether multiuser MIMO is to be used for downlink transmissions in at least one physical resource block of a subframe; and
transmitting the first DCI message including information indicating that multiuser MIMO is being used in the at least one physical resource block of the subframe that includes the first DCI message.

23. A first user equipment comprising:
a memory to store a table including a plurality of sets of information, wherein each of the sets includes at least one identifier of at least one second user equipment that is available for pairing with the first user equipment for multiuser MIMO, wherein the at least one second user equipment is in a plurality of second user equipment, and wherein the sets indicate different pairings between the first user equipment and different subsets of the plurality of second user equipment; and
a processor configured to access, based on first information in a first downlink control information (DCI) message received by the first user equipment, an indicated one of the plurality of sets of information from the table and perform at least one of interference suppression and cancellation for the at least one second user equipment based on information in the indicated one of the plurality of sets.

24. The first user equipment of claim 23, further comprising:
a receiver configured to receive a radio resource control (RRC) message from a base station, the processor being configured to configure the table based on information in the RRC message;
the receiver being further configured to receive the first DCI message from the base station, wherein the first DCI message includes information indicating whether multiuser MIMO is in use, and wherein the first DCI message includes information identifying a search space in at least one second DCI message addressed to the at least one second user equipment;
a receiver being further configured to receive the at least one second DCI message, the processor being configured to decode scheduling information over the search space of the at least one second DCI message; and
the processor being further configured to perform interference cancellation or suppression for the at least one second user equipment based on the scheduling information retrieved from the at least one second DCI message by decoding at least one physical downlink shared channel (PDSCH) of the at least one second user equipment and subtracting the decoded PDSCH signal from at least one signal received from the at least one second user equipment.

25. A base station comprising:
a processor to generate a first message addressed to first user equipment, the first message comprising information indicating a plurality of sets of information, wherein each of the sets includes at least one identifier of at least one second user equipment that is available for pairing for multiuser MIMO, wherein the at least one second user equipment is in a plurality of second user equipment, and wherein the sets indicate different pairings between the first user equipment and different subsets of the plurality of second user equipment; and
a transceiver to transmit the first message and, subsequent to transmitting the first message, transmit a first downlink control information (DCI) message addressed to the first user equipment, wherein the first DCI message comprises at least one bit that indicates an indicated one of the plurality of sets and indicates whether multiuser MIMO is in use.

26. The base station of claim 25, wherein:
the processor is further configured to determine the plurality of sets of information based on at least one of feedback from the first user equipment or the at least one second user equipment, at least one estimate of interference between the first user equipment and the at least one second user equipment, or capabilities of the first user equipment or the at least one second user equipment;
the processor is further configured to determine whether multiuser MIMO is to be used for downlink transmissions in at least one physical resource block of a subframe; and
the transceiver is further configured to transmit the first DCI message including information indicating that multiuser MIMO is being used in the at least one physical resource block of the subframe that includes the first DCI message.

* * * * *